UNITED STATES PATENT OFFICE.

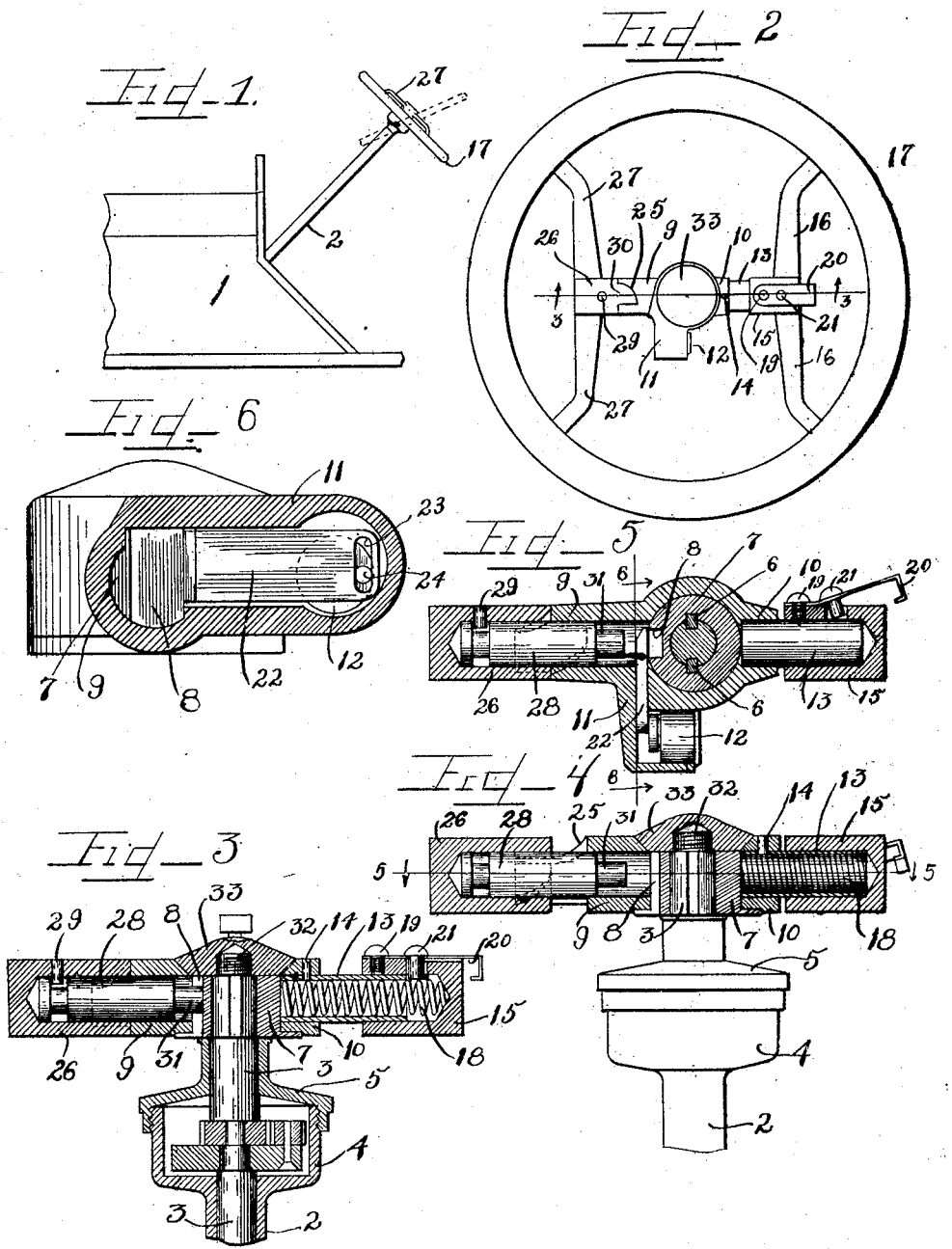

FREDERICK W. VODOZ, OF CHICAGO, ILLINOIS, ASSIGNOR TO JOHNSON AUTOMOBILE LOCK COMPANY, A CORPORATION OF ILLINOIS.

ADJUSTABLE STEERING-WHEEL AND LOCK.

1,340,638.  Specification of Letters Patent.  Patented May 18, 1920.

Application filed July 20, 1917  Serial No. 181,782.

*To all whom it may concern:*

Be it known that I, FREDERICK W. VODOZ, a citizen of the United States, and a resident of the city of Chicago, in the county of Cook and State of Illinois, have invented certain new and useful Improvements in Adjustable Steering-Wheels and Locks; and I do hereby declare that the following is a full, clear, and exact description of the same, reference being had to the accompanying drawings, and to the numerals of reference marked thereon, which form a part of this specification.

This invention relates to an improved form of adjustable steering wheel equipped with a locking mechanism, with the steering wheel capable of being swung upwardly with reference to the steering column so as to facilitate entrance into position behind the wheel. After the wheel has been swung out of normal position, a locking mechanism may be operated by a key to maintain the wheel loose upon the steering column, that is, so that it spins freely to prevent steering of the vehicle thereby, and wherein a second locking mechanism prevents complete movement of the wheel back to normal engaged position with the column shaft, except when the first locking mechanism is released by a key for the purpose.

It is an object therefore of this invention to construct a steering wheel pivotally mounted upon the steering column of a vehicle to permit the wheel to be swung upwardly out of perpendicular relation to the steering column, and when so adjusted, automatically disengaging from driving relation with the steering shaft so as to spin freely thereon.

It is also an object of this invention to construct a steering wheel adapted to be swung out of its normal plane with reference to the steering column shaft, and when so adjusted, free to spin on the column shaft, and with a locking device actuable after such adjustment of the wheel to prevent return of the wheel into normal position for interlocking engagement with the column shaft, so that the vehicle cannot be steered until the locking mechanism is released to permit return of the wheel to normal position.

It is also an object of this invention to construct a steering wheel pivotally mounted upon the upper end of a steering column for adjustment from the steering column shaft, so as to spin freely thereon, and equipped with a locking device necessitating manual release before the wheel may be adjusted out of its normal plane, together with another locking device to prevent return movement of the wheel into normal position so that the vehicle cannot be steered until said second mentioned locking device is released and the wheel returned to normal position.

It is a further object of this invention to construct a steering wheel pivotally mounted for adjustment out of its normal plane at the upper end of a steering column, and normally held in proper normal position by a latching device manually releasable to permit adjustment of the wheel, and with a key-operated locking mechanism to prevent return movement of the wheel to normal position.

Other and further important objects of the invention will be evident from the disclosures in the drawings and specification.

The invention (in a preferred form) is illustrated in the drawings and hereinafter more fully described.

On the drawings:

Figure 1 is a fragmentary detail view illustrating a steering wheel embodying the principles of my invention in the usual position upon a motor car, and showing, in dotted lines, the possibility of adjustment out of its normal plane.

Fig. 2 is a plan view of the steering wheel.

Fig. 3 is a sectional detail taken on line 3—3 of Fig. 2, with parts in elevation, and parts omitted.

Fig. 4 is a view similar to Fig. 3, but with the parts in an adjusted position such as assumed by a rotational adjustment of the wheel into the dotted line position shown in Fig. 1.

Fig. 5 is a detail section on line 5—5 of Fig. 4, with parts omitted and parts shown in elevation.

Fig. 6 is an enlarged sectional detail on line 6—6 of Fig. 5.

As shown on the drawings:

The reference numeral 1, indicates as a whole any type of vehicle on which is mounted a steering column tube 2, through which a steering column shaft 3, extends, as shown in detail in Fig. 3. Formed or secured upon the upper end of the column tube 2, is a casing 4, which incloses the operating mechanisms for spark and throttle levers which however, are not shown since they form no part of the present invention. The steering column shaft 3, extends through the casing 4, and a collar or cover cap 5, is provided for said casing 4, surrounding the column shaft 3.

Keyed upon the upper end of the column shaft 3, by means of keys 6, is a circular sleeve member 7, having a longitudinal groove or slot 8, on one side thereof. Journaled around said sleeve 7, is a casting or casing member having two tubular arms 9 and 10, respectively, and an extension 11, in which is mounted a cylinder type of lock 12. Secured in the tubular arm 10, is a cylinder or sleeve 13, extending outwardly therefrom and held securely therein by a pin 14. Journaled and slidably mounted upon said cylinder 13, is a tubular extension 15, of arms 16, which extend on each side thereof and are attached upon a wheel rim 17. Coiled within said cylinder 13, is a compression spring 18, which, at its inner end, bears against the sleeve 7, and at its outer end, against the interior of said tubular extension 15, to resist sliding movement thereof inwardly from the position in Fig. 3, to the position shown in Fig. 4. Fastened upon the tubular extension 15, by a screw 19, is a spring latch member 20, having a pin 21, secured thereto, which extends through a slot in the upper portion of said tubular member, as shown clearly in Figs. 3 and 4. With the parts in the position shown in Fig. 3, said pin projects past the end of the cylinder 13, preventing the portion 15, sliding inwardly on said cylinder except when said latch 20, is elevated, and then, as shown in Fig. 5, the wheel must have been revolved through an angle of 35 degrees, co-incident with its sliding or shifting movement. Slidably mounted in the extension 11, of the casing, is a locking bar 22, provided with a slot 23, in the outer end thereof engaged by a pin 24, secured in the end of the rotatable lock cylinder, as shown in Fig. 6, and adapted to be actuated thereby to position in front of the groove or slot 8, of the sleeve 7, when the lock 12, is actuated by the key, as shown in Fig. 5.

The outer end of the tubular arm 9, is cut away to form on its upper and under sides, a toothed recess, each recess having a curved cam edge 25. A tubular member 26, corresponding to the tubular member 15, is integral with and forms a part of extending arms 27, which are secured to the wheel rim 17, and said tubular member 26, is provided with a cylinder 28, on its interior, held from withdrawal therefrom by a pin 29, and said cylinder extends rotatably and slidably through the tubular arm extension 9. Said tubular member 26, is provided with a pair of toothed members 30, which are complemental with the toothed recesses provided in the arm extension 9, one of which is clearly shown in Fig. 2, and the cam surfaces between said complemental teeth 30, and recesses therefor, are such that a rotation of the wheel 17, out of its normal plane, will serve to impart a sliding or shifting movement thereto whereby the cylinder 28, slides outwardly in the arm 9, and the member 15, slides inwardly on the cylinder 13, of the arm 10. Formed on the inner end of the cylinder 28, is a locking pin 31, adapted to engage into the groove or slot 8, of the sleeve 7, when the wheel is in normal position, such as shown in Fig. 3, to lock the wheel as a whole upon the sleeve 7, whereby the steering column shaft 3, may be rotated by rotational adjustment of the wheel 17. The upper end of the steering column shaft 3, is reduced in diameter and threaded, as denoted by the reference numeral 32, and, engaged thereon is a retaining nut or collar 33, for the steering wheel spider casting.

The operation is as follows:

When it is desired to swing the wheel from the full line position to the dotted line position shown in Fig. 1, to facilitate entrance or exit from the driver's position in the vehicle, the spring latch 20, is elevated to withdraw the pin 21, shown in Fig. 3, from over the end of the cylinder 13, and the wheel is then swung upwardly. The upwardly swinging rotational movement of the wheel, causes the interacting cam members 30 and 25, to shift the wheel laterally or into an eccentric position, thereby withdrawing the pin 31, from the slot 8, so that the shifted wheel is free to spin upon the sleeve 7, and the vehicle cannot be steered.

In order to lock the wheel in its freely movable position to prevent theft of the vehicle, the key is inserted into the lock 12, which, by adjustment, serves to project the locking bar 22, shown in Fig. 6, across the groove or slot 8, of the sleeve 7, as shown in Fig. 5. Consequently, any readjustment of the wheel back toward normal whereby the pin 31, is brought toward engaging position with said slot is prevented by contact of the pin 31, with the locking bar 22. Thus the wheel cannot be brought back into normal position and interlocked with the sleeve 7, for driving the vehicle until the lock is released.

The construction of the steering wheel and its locking mechanism is such as to permit ready assembly of the parts and adaptation of the wheel to any type of motor vehicle, but the present form shown is that for adaptation to a particular type of steering mechanism now used on a great many small cars.

I am aware that various details of construction may be varied through a wide range without departing from the principles of this invention, and I therefore do not purpose limiting the patent granted otherwise than necessitated by the prior art.

I claim as my invention:

1. A steering wheel comprising in combination with a column steering shaft, a grooved sleeve secured upon the shaft, a casing member journaled therearound, a steering wheel slidably and rotatably mounted upon said casing, and means within said casing attached to said steering wheel adapted to engage with said grooved sleeve to lock the steering wheel upon said sleeve and retractable therefrom to permit free rotational movement of the steering wheel around said sleeve.

2. The combination with a steering shaft, of a grooved sleeve secured thereon, a casing member journaled on said sleeve, a steering wheel journaled on said casing member, means associated with said wheel and slidable through said casing for engagement with the grooved sleeve to lock said wheel and casing upon said sleeve, and locking mechanism movable across said grooved sleeve when said means is retracted to prevent engagement of said means therewith to lock said steering wheel and casing freely movable upon said steering shaft and sleeve.

3. A steering wheel mechanism comprising in combination with a steering shaft, a member fixed upon the shaft, a casing member journaled thereon, a wheel adjustably associated with said casing member, means secured to said wheel adapted by an adjustment of said wheel relative to said casing member to be retracted out of engagement with said member fixed on the steering shaft, and to be projected into engagement therewith by return of the wheel toward normal position, and locking mechanism for locking said means out of engagement with said fixed member to lock the wheel and casing freely movable relative the steering shaft.

In testimony whereof I have hereunto subscribed my name in the presence of two subscribing witnesses.

FREDERICK W. VODOZ.

Witnesses:
 CHARLES W. HILLS,
 EARL M. HARDINE.